US012800267B2

(12) United States Patent
Alexander

(10) Patent No.: US 12,800,267 B2
(45) Date of Patent: Nov. 17, 2026

(54) THROW LEVER SYSTEM

(71) Applicant: Innowave Investments, LLC, Newton, MA (US)

(72) Inventor: Jerimiah Alexander, Springville, UT (US)

(73) Assignee: INNOWAVE INVESTMENTS, LLC

( * ) Notice: Subject to any disclaimer, the term of this patent is extended or adjusted under 35 U.S.C. 154(b) by 278 days.

(21) Appl. No.: 18/418,466

(22) Filed: Jan. 22, 2024

(65) Prior Publication Data

US 2024/0263917 A1 Aug. 8, 2024

Related U.S. Application Data

(60) Provisional application No. 63/442,922, filed on Feb. 2, 2023.

(51) Int. Cl.
*G02B 7/04* (2021.01)
*F41G 1/38* (2006.01)

(52) U.S. Cl.
CPC ................. *F41G 1/38* (2013.01); *G02B 7/04* (2013.01)

(58) Field of Classification Search
CPC .... F41G 1/38; G02B 7/04; G02B 7/10; G02B 7/105
See application file for complete search history.

(56) References Cited

U.S. PATENT DOCUMENTS

| | | | | | |
|---|---|---|---|---|---|
| 5,528,847 | A * | 6/1996 | Fisher | G02B 23/14 42/122 |
| 5,930,934 | A * | 8/1999 | Fisher | F41G 1/38 42/122 |
| D695,586 | S * | 12/2013 | Brown | D8/305 |
| 10,591,252 | B2 * | 3/2020 | White | F41G 1/38 |
| 2018/0087872 | A1 * | 3/2018 | White | F41G 1/38 |
| 2018/0313634 | A1 * | 11/2018 | Davidson | F41G 1/38 |
| 2019/0195597 | A1 * | 6/2019 | Cheng | F41G 1/38 |
| 2021/0311296 | A1 * | 10/2021 | McCoy, II | G02B 23/16 |
| 2024/0167789 | A1 * | 5/2024 | Sheets, Jr. | F41G 11/003 |

FOREIGN PATENT DOCUMENTS

| | | | | |
|---|---|---|---|---|
| EP | 2520894 A1 * | 11/2012 | F41G 1/345 |
| WO | WO-2024108049 A1 * | 5/2023 | F41G 1/38 |

* cited by examiner

*Primary Examiner* — Jonathan C Weber
(74) *Attorney, Agent, or Firm* — Braxton IP PLLC; Bobby W. Braxton

(57) ABSTRACT

A throw lever system is disclosed. The throw system, which can be installed on a firearm and used with a scope, has a ring. The ring has a first reverse dovetail and a second reverse dovetail located on the ring. The first reverse dovetail is offset from the second reverse dovetail. There is a first lever releasably coupled to the first reverse dovetail. A user can manipulate one or more levers located on the ring to quickly select a desired magnification.

18 Claims, 7 Drawing Sheets

THROW LEVER SYSTEM

PRIORITY

The present invention claims priority to U.S. Provisional Application No. 63/442,922 filed Feb. 2, 2023, the entirety of which is hereby incorporated by reference.

BACKGROUND OF THE INVENTION

Technical Field

The present invention relates to a system and method for a throw lever.

Description of Related Art

There is a need for a system and method for a throw lever which can be adjusted.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1A:
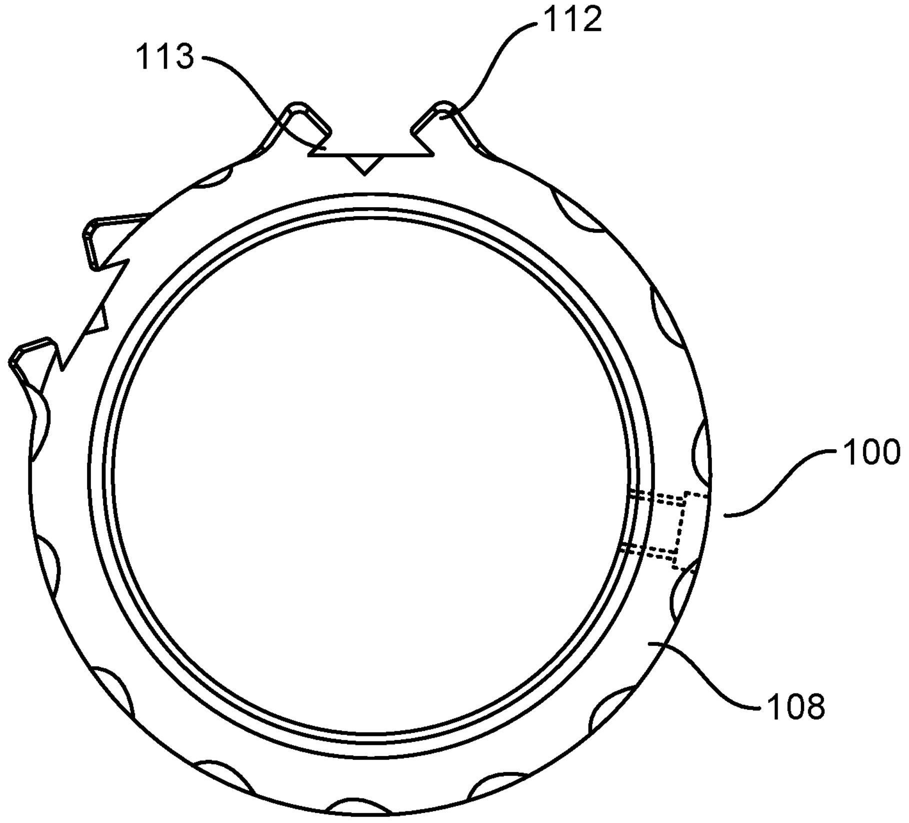
FIG. 1A is front view of the throw lever system in one embodiment.
Figure 1B:
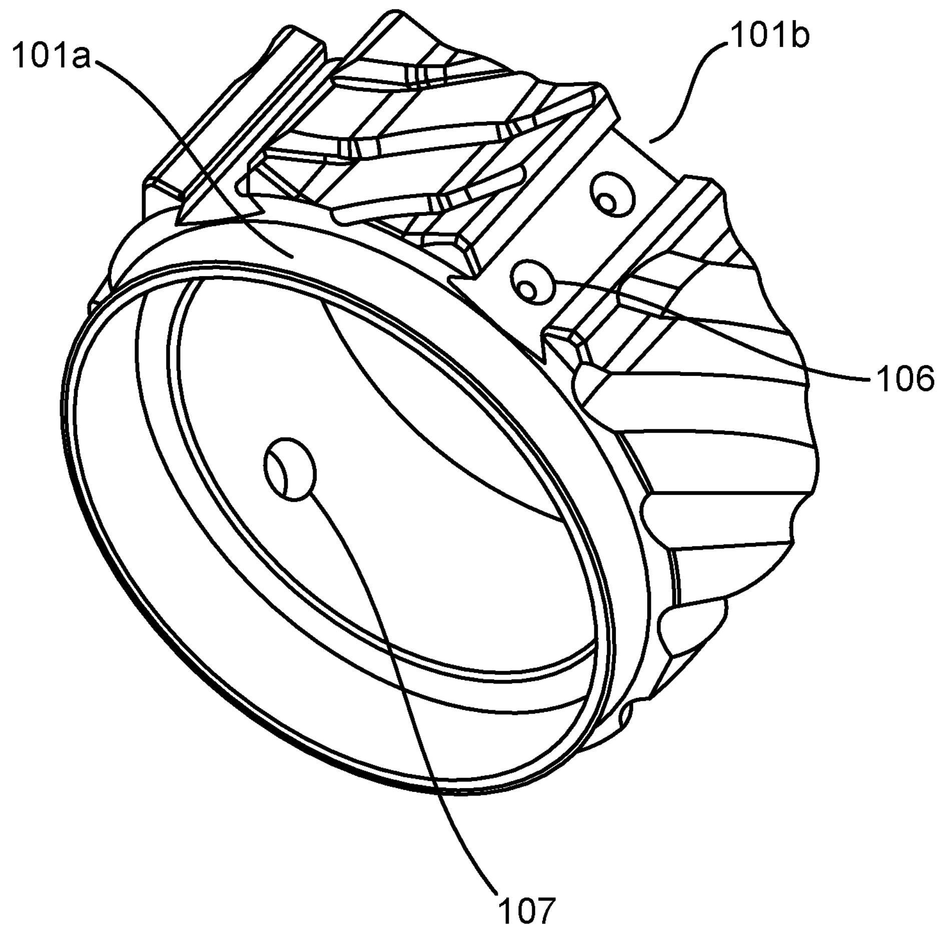
FIG. 1B is a side perspective view of the throw lever system in one embodiment.
Figure 1C:
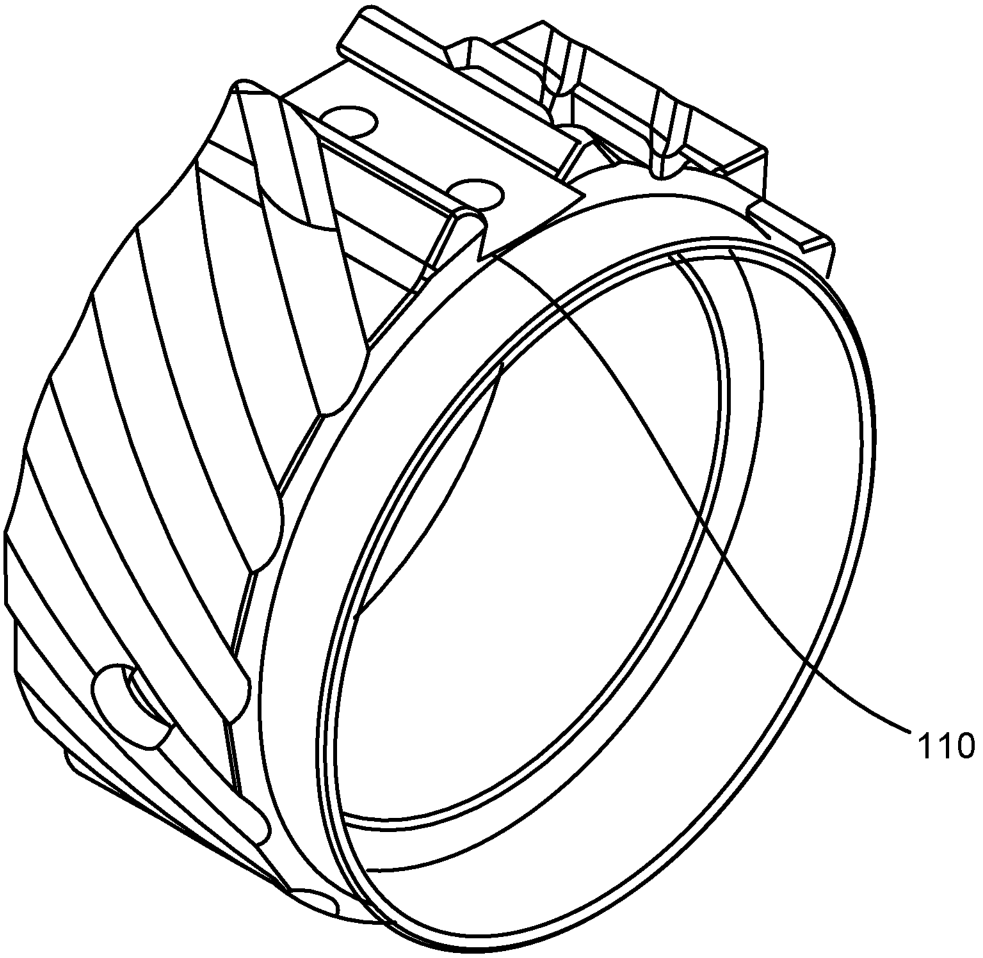
FIG. 1C is a side perspective of a throw lever system in one embodiment.

FIG. 1A is front view of the throw lever system in one embodiment. FIG. 1B is a side perspective view of the throw lever system in one embodiment. FIG. 1C is a side perspective of a throw lever system in one embodiment. A throw lever system 100, in one embodiment, helps shooters and hunters zoom in and out on a scope by adjusting the levers. This is faster, and smoother, than gripping the scope and making an adjustment. Also, the levers act as pre-sets which allow the user to quickly manipulate the scope between two or more pre-set power magnifications. As an example, in one embodiment, the user can switch from zero magnification to 4× magnification. This is for illustrative purposes only and should not be deemed limiting.

As shown, the system comprises two separate reverse dovetails 101_a,b_ located on a ring 108. While one embodiment has been described utilizing reverse dovetails as the shape, this is for illustrative purposes only and should not be deemed limiting. Other shapes can also be utilized including wherein the protrusions, discussed below, are vertical. So long as a gap is provided, and as long as that gap can be filled with an object, such as a lever or blank, then various other shapes can be utilized. A reverse dovetail 101, described in more detail below, offers some advantages including ease of coupling and de-coupling, as well as structural and securement benefits.

One benefit of the reverse dovetail shape is that it easily slides within the gap. Further, the reverse dovetail allows the blank to sit flush, or nearly flush, with the ring 108. Further, the reverse dovetail applies an upward force, securing the blank or lever in the desired location adjacent to the ring 108.

The reverse dovetail 101 is a location at which a lever or blank, discussed in more detail below, can be attached. As noted, while two locations have been described, this is for illustrative purposes only and should not be deemed limiting. More than two dovetail locations can be utilized. Thus, for example, the user can have three separate levers to correspond with varying magnification levels. Further, each lever can have dissimilar heights or dissimilar colors, or both, to help the shooter quickly determine which lever should be used for a desired magnification. As noted, one lever can correspond to no magnification, one lever can correspond to maximum magnification, and another lever can correspond to mid-range magnification.

The reverse dovetail 101 provides a way in which the lever or blanks can be quickly installed or removed from the system. The levers or blanks will simply slide within the dovetail system, coupling the lever with the system. The reverse dovetail 101_a,b_, in one embodiment, comprises two protrusions 112 which extend inwardly toward one another. Between the two inwardly extending protrusions 112 is a gap. Because the protrusions extend inwardly, the gap therebetween comprises a unique base with a triangular shape which has opposing gap corners 110. As shown the gap comprises a gap bottom 113. As shown the gap bottom 113 is flat. As shown, the two inwardly extending protrusions 112 do not intersect. Thus, the gap therebetween has an open top. This allows for placement of a lever or other item which extends outwardly beyond the protrusions. In one embodiment a lever or other item can be coupled to the reverse dovetail opening by sliding through the side of the gap/opening. In one embodiment the lever or other item to be coupled to the reverse dovetail opening comprises a base with a similar shape as the opening. Thus, if the gap has a wide and flat gap bottom 113, as well as upper and lower edge which slant inwardly, as do the inwardly extending protrusions, then the coupling object has a similar shape. This allows for a more secure coupling. Further, as noted, if the object is a lever, when the lever is pushed in one direction, the shape of the base of the lever ensures that the base of the lever has a lip 111 or other feature which extends within the gap corner 110 underlying each protrusion 112. Thus, in one embodiment the object to couple with the reverse dovetail 101 comprises a flat bottom and two opposing lips on the flat bottom which coincide with the gap corners 110 of the reverse dovetail 101. This helps secure the object in place.

As shown, there are two separate dovetails 101 locations. The first dovetail location 101_a_ is referred to as the one o'clock position. This is because the dovetail 101 aligns with the user's one o'clock orientation while in use. The second dovetail location 101_b_ is referred to as the three o'clock position. This is because the dovetail 101 aligns with the user's three o'clock orientation while in use.

While two dovetail 101*a,b* positions are shown, this is for illustrative purposes only and should not be deemed limiting. In other embodiment only a single dovetail position is utilized, whereas in other embodiments more than two dovetail positions are utilized. Similarly, while one embodiment has locations at one o'clock and three o'clock, while these are advantageous in certain embodiments, as discussed below, these are also for illustrative purposes only and should not be deemed limiting.

In one embodiment, an object, such as a lever or a blank, is releasably coupled to the ring 108 via the dovetail 101. Releasably coupling, as used herein, refers to an object which can be coupled and decoupled with another object. Releasably coupling, in some embodiments, provides advantages such as versatility and increased customization. A user, because of releasably coupling, can attach and detach levers or blanks to match a user's specific needs. While some embodiments include a lever which is releasably coupled to the ring 108, in other embodiments, one or more rings are permanently attached to the ring.

FIG. 1B also shows that each dovetail 101 comprises a dovetail coupler 106. The dovetail coupler 106 is a void which can receive a screw, bolt, or the like to help couple the dovetail 101 with a lever, blank, etc. The dovetail coupler 106 provides a mechanism by which the lever, for example, can be releasably coupled to the dovetail. The dovetail coupler 106 can be a recessed divot which can receive an object to properly align the lever 102. In other embodiments, the dovetail coupler 106 can be threaded to receive a threaded screw.

In one embodiment the dovetail coupler 106 does not extend completely through the ring 108. Instead, the void of the dovetail coupler 106 terminates within the ring 108. This prevents water leakage which could otherwise reach to the inner side of the ring 108. This also prevents a direct water path to the inner side of the ring 108 when no lever or blank is installed. Further, this prevents a direct path for dirt or other items from reaching the inner side of the ring 108 through the dovetail coupler. As noted, in one embodiment the dovetail coupler 106 comprises threads which engage with threads on a bolt, screw, etc.

FIG. 1B also shows a firearm coupler 107. This is a void which, in the embodiment depicted, extends completely through the ring 108. This allows a tension screw to be inserted through the firearm coupler 107 to couple the ring 108 with the firearm/scope.

FIG. 1B also shows that the dovetails are offset radially from one another. As noted, this provides different locations for the levers. In one embodiment the ring 108 is cylindrical and can be placed around a cylindrical scope. The diameter of the ring 108 can be adjusted depending upon the size of the scopes. To install the ring 108, the user simply slides the ring 108 over the scope. The user rotates the ring 108 such that a desired dovetail 101 coincides with a desired magnification as noted by the scope. The user can then secure the ring 108 to the scope with the firearm coupler 107. The user can couple the levers and/or blanks to the gaps in the ring 108 before or after coupling to the scope/firearm.

The ring 108 can comprise virtually any material. It can include plastics, rubber, and combinations thereof. The ring 108 can be extruded, 3D printed, or made in any method known in the art. The levers and blanks can comprise the same or a dissimilar material as the ring 108. In one embodiment the ring 108 has indentions along its other periphery to assist with grip.

Figure 2:
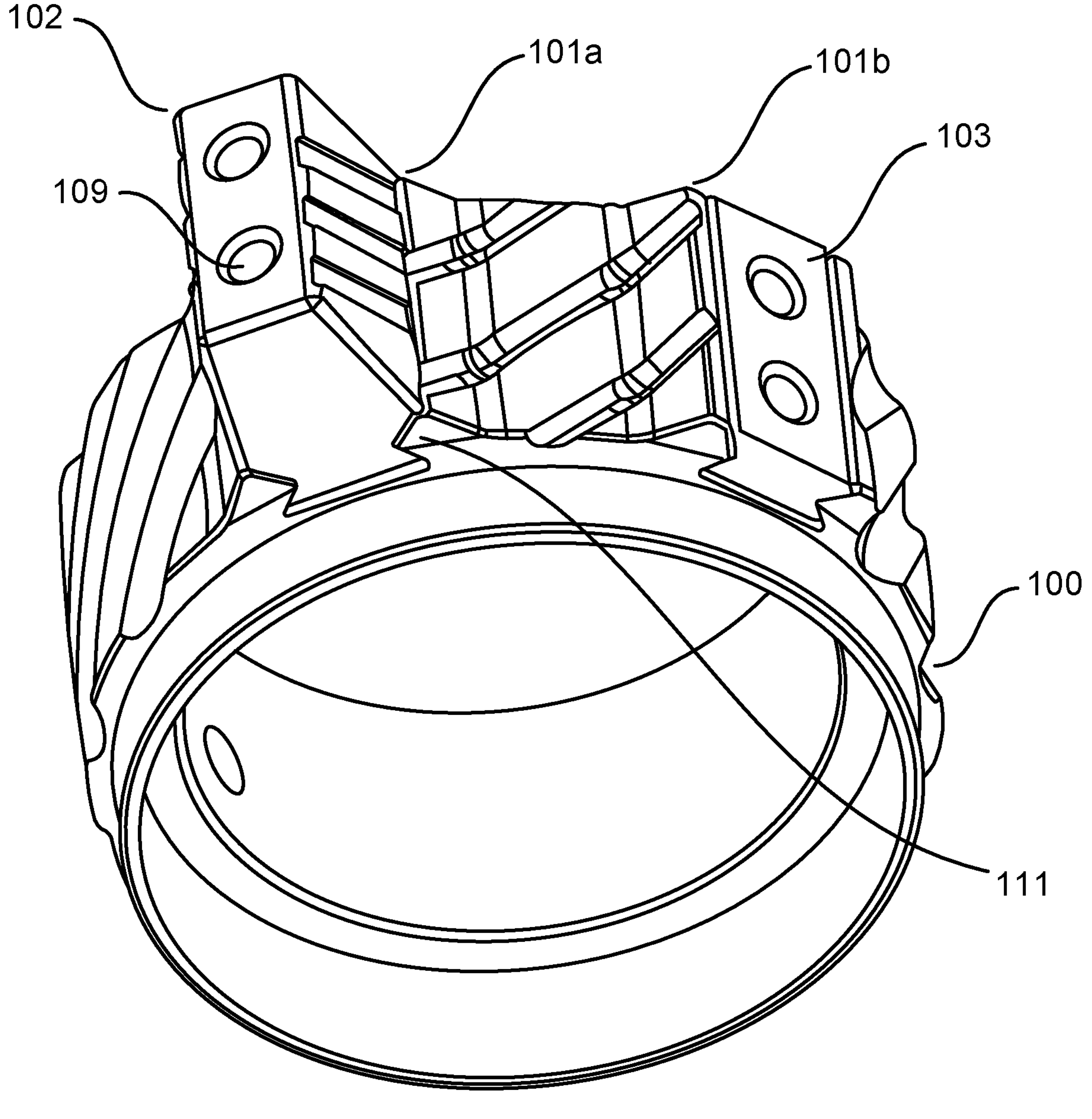
FIG. 2 is a perspective view of a throw lever with a lever and a blank installed in one embodiment.

FIG. 2 is a perspective view of a throw lever with a lever 102 and a blank 103 installed in one embodiment. FIG. 2 illustrates the versatility of the various configurations. In the embodiment depicted, the user wanted a single lever 102. The user therefore installed a blank 103 into one of the dovetail 101 locations. In other configurations, the user can install two different levers 102. In one embodiment, the two levers 102 comprise different lengths. In this fashion, the user can immediately discern the difference between the two or more levers 102.

As shown, the lever and the blank both comprise two coupler voids 109. A screw, bolt, etc. can be inserted through the coupler voids 109 to engage with the dovetail coupler 106. When the screw or bolt has been sufficiently withdrawn so that it no longer engages with the dovetail coupler 106 then the lever 102 can be withdrawn from the dovetail 101. The lever 102 can then be replaced with a new lever 102 or a blank 103. Thus, the system described has significant versatility.

As shown the lever 102 comprises a wedge shape. It has a wider base and extends to a narrower top. As shown, rather than being a thin post, the lever 102 has a substantial width. This allows a user to reach and make contact with the entire width of the lever 102. This provides for increased leverage as opposed to a post which offers a single point of contact. In one embodiment the lever 102 extends for substantially the entire width of the ring 108.

As shown the lever 102 comprises a flat bottom and a triangular cross-section. The sloped sides of the triangle slope inwardly. The triangular shape on the sides of the flat bottom coincides with the lips 111 of the ring, and two opposing lips on the flat bottom which coincide with the gap corners 110 of the reverse dovetail 101. This helps secure the object in place.

While not depicted, in some embodiments, the lever 102 can comprise a backing which is a portion of the lever 102 which extends beyond the ring and which prevents the lever 102 from being placed further inward toward the ring. A backing would allow the lever 102 to be inserted in only one direction before the backing interfered with the ring 108 and prevented any further movement of the lever 102.

If a user wanted more real estate than what the wedge has provided, or put differently if the user desired additional surface area, then two levers 102 can be coupled and stacked horizontally. This further increases the total surface area of the adjacent levers 102. The two levers 102 can be coupled via any method known in the art.

Figure 3:
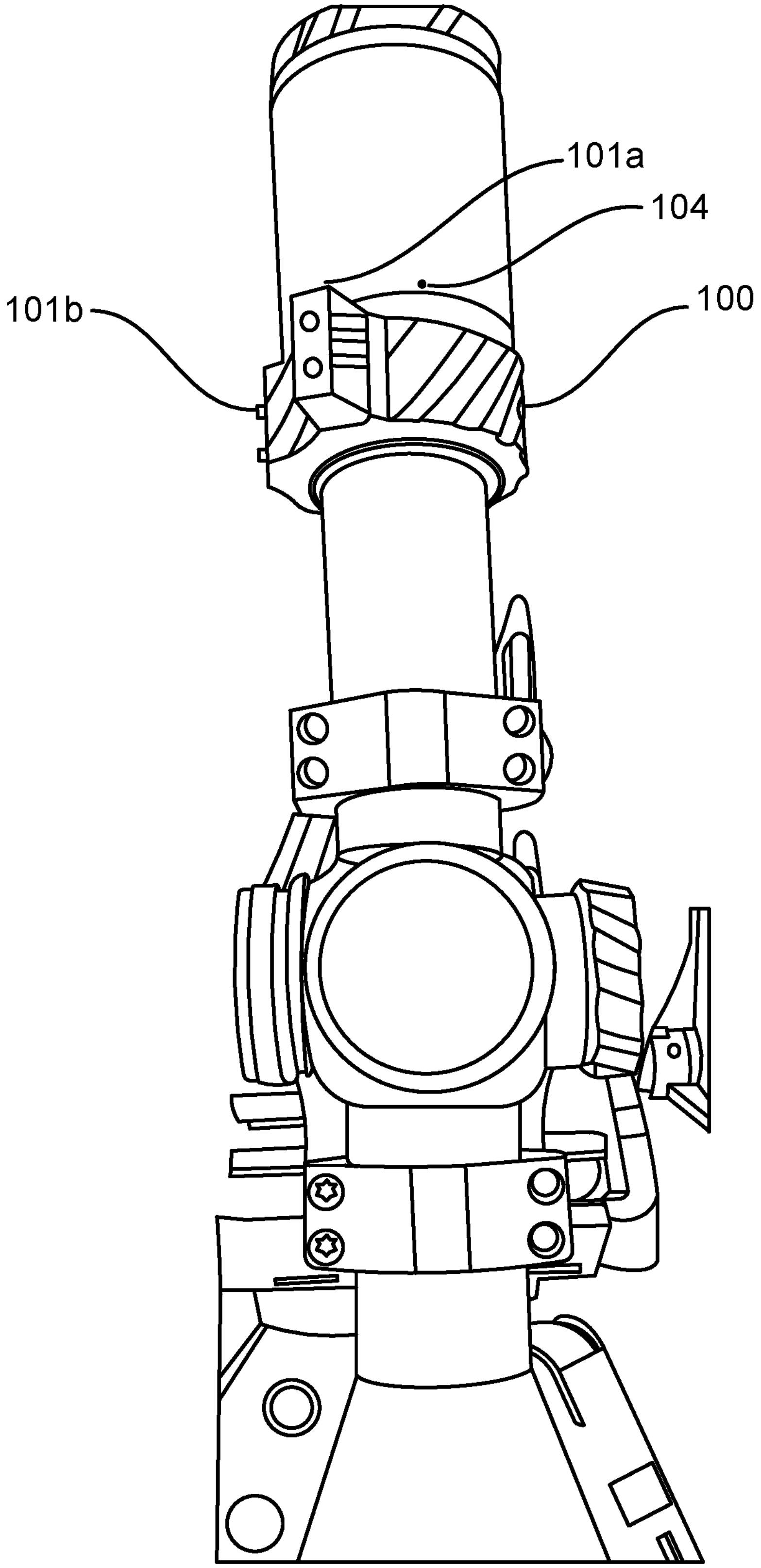
FIG. 3 is a perspective view of a throw lever system installed on a firearm in one embodiment.

FIG. 3 is a perspective view of a throw lever system installed on a firearm in one embodiment. As can be seen, the scope has a power indicator 104. When the ring 108 is rotated, the power of the scope is adjusted. As noted, the ring 108 can be adjusted by the various levers 102 which are coupled to the rings 108. The user can orient the levers 102 such that the levers 102 align with a desired magnification.

In embodiment the ring 108 is rotatable relative to the firearm. However, when secured to the scope, the scope will rotate with movement of the ring 108.

As shown, the first dovetail location 101*a* is at the one o'clock position, and the second dovetail location 101*b* is at the three o'clock position. The first dovetail location 101*a* is on low power as indicated. The user can grab the lever 102 and manipulate the lever 102 to align to a predetermined power. Thus, the user can switch between a first desired magnification and a second desired magnification by manipulating the first lever.

For a right-handed shooter, the user will use their left hand, in one embodiment to grab the lever 102 in the one o'clock position (101*a*). The user will throw the lever 102 to the nine o'clock position which results in increased power. In one embodiment, the nine o'clock, position is about a 6 as indicated by the power indicator. In one embodiment a user's wrist is such that movement from the one o'clock to the nine o'clock aligns with the typical user's flexibility within the wrist. Thus, in a single fluid motion, the user can move from low power to an intermediate power, in one embodiment.

Figure 4:
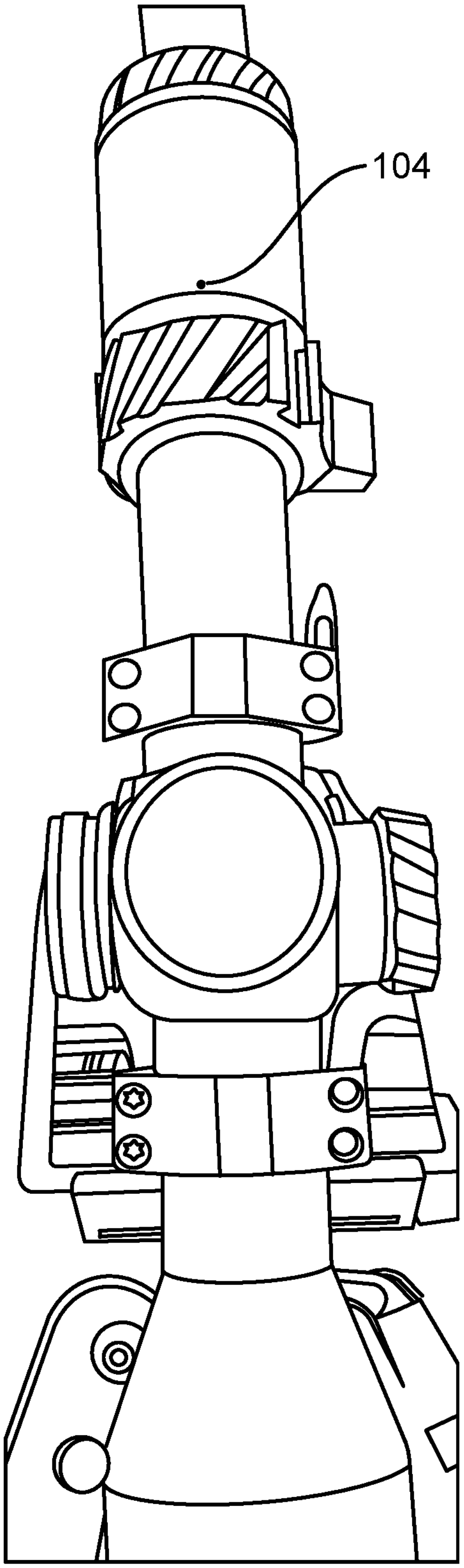
FIG. 4 is a perspective view of a throw lever system installed on a firearm in one embodiment.

FIG. 4 is a perspective view of a throw lever system installed on a firearm in one embodiment. In this embodiment, the lever 102 from the one o'clock position has been moved to the nine o'clock position resulting in an intermediate power magnification.

If the user instead grabs the lever 102 in the three o'clock position (101*b*), the user can move to full power. Thus, in one fluid motion, by manipulating the lever 102 in three o'clock position, the user can move from no power to full power.

As can be seen, the various levers 102, and their relative locations along the ring 108 allows for various magnifications of power to be utilized. If a target is mid-range, the user can manipulate the lever 102 in the one o'clock position to obtain a magnification power of 6, in the embodiment depicted. If, however, a target is further away, the user can select the lever 102 in the three o'clock position and select maximum magnification power.

As noted, in one embodiment the two or more levers 102 comprise dissimilar heights. This allows the user to quickly identify the proper lever 102 for adjustment. Because they are different in height, the user can tactically decipher between the two levers 102, even without looking. Aside from dissimilar heights, in one embodiment the two or more levers 102 can comprise different colors to help differentiate between the two.

Because the levers 102 can be quickly and easily removed, the user can customize the throw system 100 to have the desired configuration of levers 102 and/or blanks 103. If the user wants a lever 102 with a greater height, the user can install such a lever 102. Similarly, if the user wants a lever 102 with a decreased height, the user can install such a lever 102. The user can have a lever 102 with a greater height in the one o'clock position compared to the three o'clock position, or they can have a lever 102 with a decreased height in the one o'clock position compared to the three o'clock position.

Figure 5:
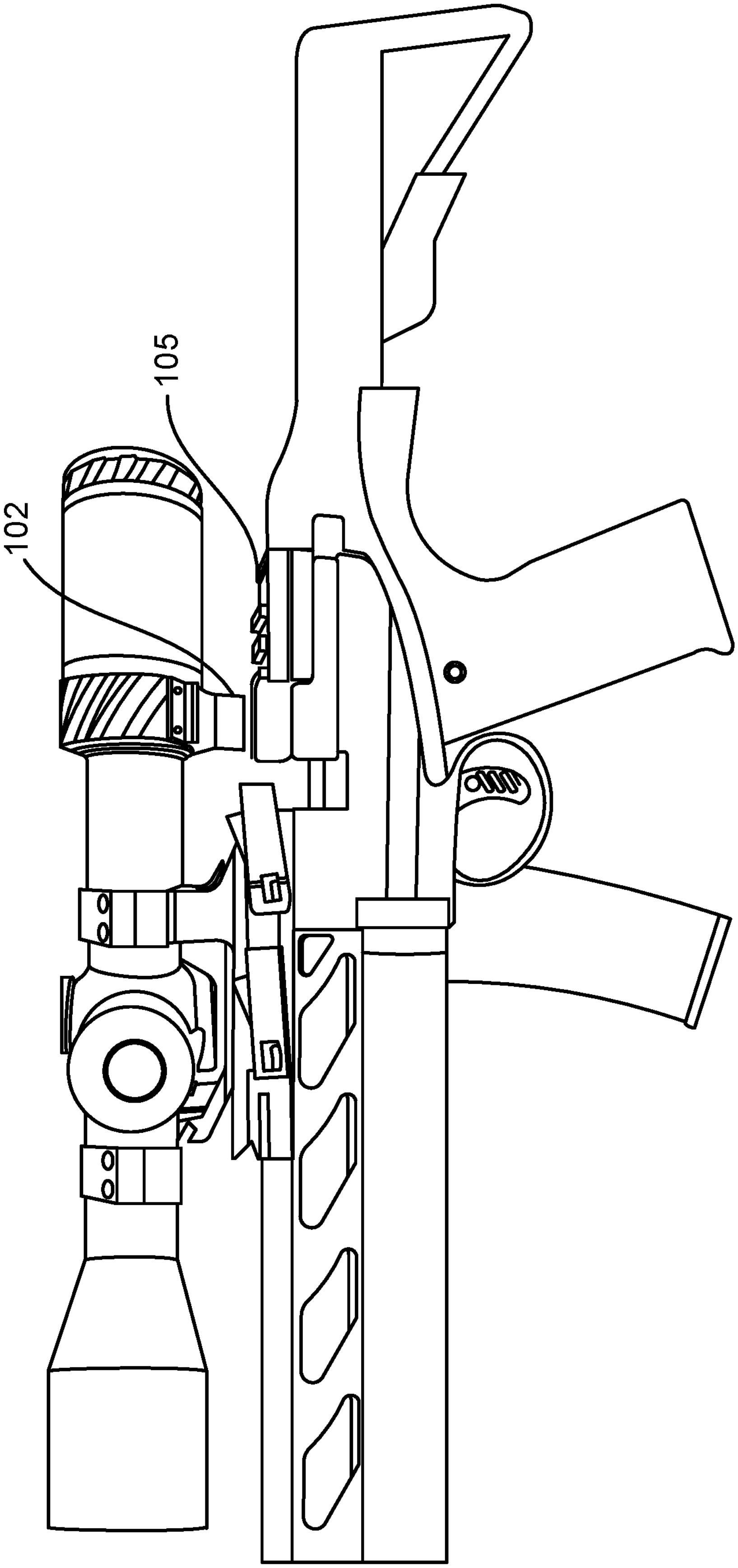
FIG. 5 is a perspective view of a throw lever system installed on a firearm in one embodiment.

FIG. 5 is a perspective view of a throw lever system installed on a firearm in one embodiment. As shown, the lever 102 can rotate freely and not hit the rail 105 of the firearm. However, different scopes and scope mounts can alter the distance between the throw system 100 and the firearm. This is another advantage to having the ability to change the height of the lever 102. If a longer lever 102 cannot swing by the firearm without engaging, then a shorter lever 102 can be swapped.

The system has many advantages over the prior art. The system is versatile, as described above. The user can customize the location, the number, the height, and the color of the levers to meet the user's desired specifics. If there are two or more levers, the height and/or color can be adjusted or differentiated so the user can easily spot the various levers without difficulty. This allows the user to quickly and easily distinguish the various levers and know which lever to manipulate to obtain the desired magnification.

Another advantage is the ability to install the system without permanent modification to the firearm or scope. The system can be coupled to the scope/firearm with a coupler, such as a set screw, and then easily removed. Further, because in some embodiments the couplers do not extend through the ring, access to the inner side of the ring through the couplers is prevented.

While the invention has been particularly shown and described with reference to a preferred embodiment, it will be understood by those skilled in the art that various changes in form and detail may be made therein without departing from the spirit and scope of the invention.

What is claimed is:

1. A throw lever system, said system comprising:
- a ring comprising a firearm coupler, wherein the firearm coupler extends completely through the ring;
- a first reverse dovetail located on said ring, wherein said first reverse dovetail comprises a first dovetail coupler which is a void which extends below said first reverse dovetail and into said ring, and wherein said second dovetail coupler does not extend completely through said ring;
- a second reverse dovetail located on said ring, wherein said second reverse dovetail comprises a second dovetail coupler which is a void which extends below said second reverse dovetail and into said ring, and wherein said second dovetail coupler does not extend completely through said ring, wherein said second reverse dovetail is offset from said first reverse dovetail;
- a first lever releasably coupled to said first reverse dovetail.

2. The system of claim 1 further comprising a second lever releasably coupled to said second reverse dovetail.

3. The system of claim 2 wherein said second lever has a dissimilar height than said first lever.

4. The system of claim 1 further comprising a blank releasably coupled to said second reverse dovetail.

5. The system of claim 1 wherein said first reverse dovetail comprises two protrusions which extend inwardly toward one another to create an open topped gap.

6. The system of claim 5 wherein said open topped gap comprises a triangular shaped base with opposing gap corners.

7. The system of claim 5 wherein said first lever comprises lips on a base, wherein said lips fit within said opposing gap corners.

8. The system of claim 1 wherein said first reverse dovetail aligns with a one o'clock orientation, and wherein said second reverse dovetail aligns with a three o-clock orientation along said ring.

9. A firearm, said firearm comprising:
- a throw system, said throw system comprising:
  - a ring comprising a firearm coupler, wherein the firearm coupler extends completely through the ring;
  - a first reverse dovetail located on said ring, wherein said first reverse dovetail comprises a first dovetail coupler which is a void which extends below said first reverse dovetail and into said ring, and wherein said first dovetail coupler does not extend completely through said ring;
  - a second reverse dovetail located on said ring, wherein said second reverse dovetail comprises a second dovetail coupler which is a void which extends below said second reverse dovetail and into said ring, and wherein said second dovetail coupler does not extend completely through said ring, wherein said second reverse dovetail is offset from said first reverse dovetail;
  - a first lever releasably coupled to said first reverse dovetail;

wherein said firearm further comprises a scope, and wherein when said ring is rotated, the power of said scope is adjusted.

10. The firearm of claim 9 wherein said first reverse dovetail corresponds to a first desired magnification, and wherein said second reverse dovetail corresponds to a second desired magnification.

11. The firearm of claim 10 wherein a user can switch between said first desired magnification and said second desired magnification by manipulating said first lever.

12. The firearm of claim 9 wherein ring is rotatable relative to said firearm.

13. The firearm of claim 9 wherein said first reverse dovetail aligns with a one o'clock orientation, and wherein said second reverse dovetail aligns with a three o-clock orientation along said ring.

14. The firearm of claim 9 wherein said ring is fixed relative to said scope via firearm couplers.

15. The firearm of claim 9 wherein the location of said first lever can be aligned with a desired magnification on said scope.

16. The firearm of claim 9 further comprising a second lever releasably coupled to said second reverse dovetail.

17. The firearm of claim 16 wherein said second lever has a dissimilar height than said first lever.

18. The firearm of claim 17 wherein said second lever has a dissimilar color than said first lever.

* * * * *